US006815092B2

(12) United States Patent
Van den Bergh et al.

(10) Patent No.: US 6,815,092 B2

(45) Date of Patent: Nov. 9, 2004

(54) RADIATION IMAGE STORAGE PANEL

(75) Inventors: Rudolf Van den Bergh, Lint (BE); Thomas Cabes, Lier (BE)

(73) Assignee: AGFA-Gevaert, Mortsel (BE)

( * ) Notice: Subject to any disclaimer, the term of this patent is extended or adjusted under 35 U.S.C. 154(b) by 177 days.

(21) Appl. No.: 10/036,287

(22) Filed: Dec. 24, 2001

(65) Prior Publication Data

US 2003/0104245 A1 Jun. 5, 2003

(30) Foreign Application Priority Data

Dec. 5, 2001 (EP) ............................................ 01000711

(51) Int. Cl.[7] ........................... B32B 19/00; B32B 9/00; B21K 4/00; H05B 33/12

(52) U.S. Cl. .................... 428/690; 428/917; 250/484.4; 250/588

(58) Field of Search ................................ 428/690, 917; 313/504, 506; 250/484.4, 588

(56) References Cited

U.S. PATENT DOCUMENTS

| | | | | | |
|---|---|---|---|---|---|
| 4,239,968 | A | | 12/1980 | Kotera et al. ............ | 250/327.1 |
| 4,535,237 | A | | 8/1985 | Takahashi et al. ....... | 250/327.2 |
| 4,587,036 | A | | 5/1986 | Degenhardt .............. | 252/301.4 |
| 4,604,525 | A | * | 8/1986 | Kitada et al. .......... | 250/363.01 |
| 4,728,583 | A | * | 3/1988 | Yamazaki et al. .......... | 428/690 |
| 4,963,751 | A | * | 10/1990 | Kano et al. .............. | 250/484.4 |
| 5,227,254 | A | | 7/1993 | Brixner et al. .............. | 428/691 |
| 5,340,661 | A | * | 8/1994 | Van Havenbergh et al. | 428/690 |
| 5,380,599 | A | | 1/1995 | Brixner et al. .............. | 428/691 |
| 5,466,541 | A | * | 11/1995 | Van Havenbergh et al. | 428/690 |
| 5,905,014 | A | | 5/1999 | Van de Bergh ............. | 430/139 |
| 5,925,473 | A | * | 7/1999 | Kuriyama et al. .......... | 428/690 |
| 6,246,063 | B1 | | 6/2001 | Fukui ...................... | 250/484.4 |
| 6,344,657 | B1 | * | 2/2002 | Matsumoto et al. ........ | 250/588 |

FOREIGN PATENT DOCUMENTS

| | | | |
|---|---|---|---|
| EP | 510754 | * | 10/1992 |
| EP | 0 967 620 A1 | | 12/1999 |
| EP | 0 967 620 | | 12/1999 |

* cited by examiner

*Primary Examiner*—Rena Dye
*Assistant Examiner*—Camie S Thompson
(74) *Attorney, Agent, or Firm*—Joseph T. Guy; Nexsen Pruet, LLC

(57) ABSTRACT

In accordance with the present invention a radiation image storage panel comprises a self-supporting or supported layer of storage phosphor particles dispersed in a binding medium and, adjacent thereto, a protective coating characterized in that, besides a binder, the said protective coating comprises a white pigment having a refractive index of more than 1.6, which is present in the said binder, preferably further comprising a urethane acrylate, and wherein said protective coating has a surface roughness (Rz) between 2 and 10 $\mu$m.

20 Claims, No Drawings

RADIATION IMAGE STORAGE PANEL

FIELD OF THE INVENTION

The present invention relates to a radiation image storage panel suitable for use in the radiation image recording and reproducing method utilizing a stimulable phosphor.

BACKGROUND OF THE INVENTION

In radiography the interior of objects is reproduced by means of penetrating radiation which is high energy radiation belonging to the class of X-rays, γ-rays and high energy elementary particle radiation, e.g. β-rays, electron beam or neutron radiation. For the conversion of penetrating radiation into visible light and/or ultra-violet radiation luminescent substances are used called phosphors.

During the last decade as a method replacing conventional radiography, radiation image recording and reproducing methods were developed utilizing a stimulable phosphor. Use is made in that method from a radiation image storage panel comprising a support and a stimulable phosphor layer provided thereon, wherein the steps are performed of causing the stimulable phosphor of the panel to absorb radiation energy having passed through an object or having radiated from an object, sequentially exciting the stimulable phosphor with an electromagnetic wave such as visible light or infrared rays, also called “stimulating rays”, in order to release the radiation energy stored in the phosphor as light emission (thus by stimulated emission), photoelectrically detecting and storing in digital form the emitted light and reproducing the radiation image of the object as a visible image from the stored digital information. The panel thus treated is subjected to a step for erasing a radiation image remaining therein, in order to be available for the next recording and reproducing procedure, thus providing repeated use.

The method described above permits use of reduced irradiation doses, when compared with a conventional radiography using a combination of a radiographic film and radiographic intensifying screen, where remakes may more often occur, due to failure in choice of exposure amounts: digital processing permits further electronic corrections and can provide enhanced image characteristics. Further, the method is very advantageous from the viewpoints of conservation of resource and economic efficiency because the radiation image storage panel can be repeatedly used while the radiographic film is consumed for each radiographic process in the conventional radiography.

The radiation image storage panel employed in the above-described method has a basic structure comprising a support and a stimulable phosphor layer provided on one surface of the support. If the phosphor layer is self-supporting, the support may be omitted. The phosphor layer usually comprises a binder and stimulable phosphor particles dispersed therein, but it may consist of agglomerated phosphor with no binder. The phosphor layer containing no binder can be formed by deposition process (e.g. chemical vapour deposition) or firing process. Further, the layer comprising agglomerated phosphor soaked with a polymer is also known. A transparent film of polymer material is normally placed on the free surface (surface not facing the support) of the phosphor layer in order to protect the layer from chemical deterioration or physical shock. This surface protective film can be formed by various methods, for example, by applying a solution of resin (e.g., cellulose derivatives, polymethyl methacrylate, polyurethane acrylate), by fixing a transparent resin film (e.g., a glass plate, a film of organic polymer such as polyethylene terephthalate) with adhesive, or by depositing inorganic materials on the phosphor layer.

In order to improve the quality (e.g., sharpness, graininess) of the resultant visible image, a radiation image storage panel having a protective film of a particular haze is proposed in JP-A 62-247298. A storage panel having a new protective film with a multi-layered structure comprising a plastic film and a fluorocarbon resin layer containing light-scattering fine particles has been proposed in U.S. Pat. No. 5,925,473.

The radiation image storage panel is repeatedly used in the cyclic procedure comprising the steps of: exposing to a radiation (for recording of a radiation image), irradiating with stimulating rays (for reading of the recorded image), and exposing to erasing light (for erasing the remaining image). In this procedure, the storage panel is transferred from one step to another by means of conveying means such as belt and rollers in the radiation image recording and reproducing apparatus, and after a cycle of the steps is conducted, the storage panel is piled up on other storage panels and stored for next cycle. Stains and abrasions due to direct contact of the surface of the storage panel with conveying means (e.g., belt and rollers) in the apparatus are highly responsible for disturbing passage of the stimulating ray and/or the stimulated emission, and consequently depress the resultant image quality. For this reason, the surface of the panel has to have enough durability to resist the stains and abrasions. A smooth and durable protective layer is thus highly desired.

Otherwise the sharpness of resultant image, as a rule, is improved by thinning the protective film. A thin protective film, however, often cannot satisfactorily protect the panel from the stains and abrasions, and hence the storage panel with the thin protective film generally has unsatisfactory durability. In order to solve this problem, various protective films were proposed. For example, a material having both high transparency and enough strength (e.g., polyethylene terephthalate) can be employed, or some kinds of resins can be used in combination. Further, a protective film having a multi-layered structure is also known. Those known protective films have been developed in consideration of protection of the stimulable phosphor layer from chemical and physical deterioration (e.g., scratch resistance, stain resistance and abrasion resistance), as well as sharpness of the resultant image. However, although those protective films are improved to a certain extent, their properties should be more improved. The image quality, particularly sharpness, besides being determined mainly by the thickness of the phosphor layer and the packing density, strongly depends on optical scattering phenomena in the phosphor layer. Those scattering phenomena particularly depend on the crystal size distribution of the phosphor particles, their morphology and the choice and amount of binder present in the phosphor layer or layers, which again is decisive for the packing density attainable for the phosphor particles. As is further also well-known the sensitivity of the screen is determined by the chemical composition of the phosphor, its crystal structure and crystal size properties, the weight amount of phoshor coated in the phosphor layer and the thickness of the phosphor layer.

It is general knowledge that sharper images with less noise are obtained with phosphor particles having a smaller average particle size, but light emission efficiency declines with decreasing particle size. Optimisation of average particle size for a given application clearly requires a compromise between imaging speed and image sharpness desired.

Moreover the wavelength of the stimulating rays, providing emission of energy stored in the stimulable phosphor particles is decisive for the sharpness obtained: although having longer wavelengths than the light emitted by the storage phosphors after having been stimulated, shorter wavelengths (in the green to red range) selected from the stimulation spectrum clearly lead to a better sharpness than red to infrared light. Apart therefrom scattering of fluorescent radiation generated by the screens is known to be decreased by incorporating dyes in the storage panels, such as in U.S. Pat. No. 5,905,014, wherein a radiation image storage panel is provided having a support, an intermediate layer and a phosphor layer comprising a binder and a stimulable phosphor dispersed therein, said panel being colored with a colorant so that the mean reflectance of said panel in the wavelength region of the stimulating rays for said stimulating phosphor is lower than the mean reflectance of said panel in the wavelength region of the light emitted by said stimulable phosphor upon stimulation thereof, wherein said colorant preferably is a triarylmethane dye having at least one aqueous alkaline soluble group and is present in at least one of said support, said phosphor layer or an intermediate layer between said support and said phosphor layer. Improvement with respect to image definition, preferably without loss in speed thanks to introduction of optimized amounts of dyes, has always been highly appreciated, as well as any other measure providing an improved relationship between speed and sharpness. Therefore in U.S. Pat. No. 6,246,063 manufacturing of a storage phosphor screen or panel has been disclosed, said screen having a phosphor layer of a stimulable phosphor, and a surface protective film provided thereon, wherein the surface protective film exhibits its scattering with a scattering length of 5 to 80 μm. More in detail said surface protective film contains light-reflecting material such as titanium dioxide, dispersed in a resin, to provide a radiation image storage panel having high surface durability, giving thereby an image of high sharpness with high sensitivity. Light-scattering in a particular degree as set forth in that invention really improves sharpness besides having enough thickness in favour of durability.

A problem may however arise from the presence of white particles in that this may cause visualization of so-called "screen structure noise" in the image resulting therefrom, thus disturbing said image and decreasing its diagnostic value. It should be stressed again that the phenomena of "sharpness" and "screen structure noise" are highly depending on irradiation by the stimulating rays, providing emission of energy, stored in the phosphor particles previously excited by X-rays.

Furtheron although a smooth and durable protective layer is highly desired in order to avoid abrasion and stains when smooth storage panels are in direct contact conveying means as belt and rollers in the apparatus in order to get read-out, there may occur problems in that smooth panels sliding in the read-out apparatus are not correctly positioned therein and may cause further problems therein, related with runability and manutention.

SUMMARY OF THE INVENTION

It is therefore an object of the present invention to provide a radiation image storage panel having a very good image resolution without loss in speed and having an excellent runability in a read-out apparatus after having been exposed to X-rays.

It is another object to offer radiation image storage panels that have a low manufacturing cost and high diagnostic value, i.e. without disturbing visualization of "screen structure noise".

Still another object of the present invention is to provide an image storage panel having high surface durability, i.a. avoiding damaging of the surface by stain and abrasion after multiple use.

To summarize the scope of the present invention: besides ease of manipulation, an excellent image quality (improved sharpness) without screen structure noise increase is strived for.

Other objects and advantages of the invention will become clear from the following description and examples.

The above-mentioned advantageous effects have effectively been realized by means of a radiation image storage panel comprising a self-supporting or supported layer of storage phosphor particles dispersed in a binding medium and, adjacent thereto, a protective coating characterized in that, besides a binder, the said protective coating comprises a white pigment having a refractive index of more than 1.6, more preferably a refractive index of more than 2.0, and even more defined titanium dioxide, which is present in the said binder, optionally further comprising a urethane acrylate, and wherein said protective coating has a surface roughness (Rz) between 2 and 10 μm.

Specific features for preferred embodiments of the invention are set out in the dependent claims.

Further advantages and embodiments of the present invention will become apparent from the following description.

DETAILED DESCRIPTION

The radiation image storage panel according to the present invention is thus provided with a self-supporting or supported layer of phosphor particles dispersed in a binding medium and, adjacent thereto, a protective coating, characterized in that, besides a binder, said protective coating comprises a white pigment having a refractive index of more than 1.6. In a more preferred embodiment said white pigment has a refractive index of more than 2.0 (like e.g. $MgTiO_3$, even having a refractive index of 2.3) and even most preferred is titanium dioxide as a white pigment, wherein said image storage panel is further characterized in that said protective coating has a surface roughness (Rz) between 2 and 10 μm. When said white pigment having a refractive index as claimed is present in the said binder, preferably comprising an urethane acrylate, an improvement in sharpness of images, obtained after having read-out said radiation image storage panels in a digital processing apparatus.

Said white pigment present in the protective overcoat layer is thus, in the most preferred embodiment, composed of titanium dioxide (rutile or anatase type titanium dioxide). It is preferably present in an amount by weight of up to 5%, more preferably up to 2% and still more preferably up to 1% versus said binder (material of the protective layer), whereby no loss in speed for said processed film material is observed.

In order to fully reach the objects of the present invention with respect to diagnostic value of the image obtained however, said protective coating should have a surface roughness (Rz) between 2 and 10 μm, and even more preferred between 3 and 8 μm.

Moreover as a white pigment a stimulable phosphor can be used. Said white pigment preferably has an average particle size diameter of less than 2 μm, more preferably less than 1 μm and still more preferably from 0.1–0.5 μm Useful radiation curable compositions for forming a protective coating of the storage phosphor panel according to the present invention contain as primary components:

(1) a crosslinkable prepolymer or oligomer, (2) a reactive diluent monomer, and in the case of an UV curable formulation (3) a photoinitiator.

Examples of suitable prepolymers for use in a radiation-curable composition applied according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryltype end groups are described in EP-A 0 207 257 and Radiat. Phys. Chem., Vol. 33, No. 5, p. 443–450 (1989). The latter liquid co-polyesters are substantially free from low molecular weight, unsaturated monomers and other volatile substances and are of very low toxicity (ref. the journal "Adhäsion" 1990 Heft 12, page 12). In DE-A 2838691 the preparation of a large variety of radiation-curable acrylic polyesters is given. Mixtures of two or more of said prepolymers may be used. A survey of UV-curable coating compositions is given e.g. in the journal "Coating" 9/88, p. 348–353.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition. A photosensitizer for accelerating the effect of the photoinitiator may be present. Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethyl-benzoate; acetophenone series compounds such as acetophenone, trichloroacetophenone, 1,1-dichloroacetophenone, 2,2-diethoxyaceto-phenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone; etc . . .

A particularly preferred photoinitiator is 2-hydroxy-2-methyl-1-phenyl-propan-1-one which product is marketed by E. Merck, Darmstadt, Germany under the tradename DAROCUR 1173. The above mentioned photopolymerization initiators may be used alone or as a mixture of two or more. Examples of suitable photosensitizers are particular aromatic amino compounds as described e.g. in GB-A's 1,314,556 and 1,486,911 and in U.S. Pat. No. 4,255,513 and merocyanine and carbostyryl compounds as described in U.S. Pat. No. 4,282,309.

In a particular embodiment the binder of the said protective overcoat layer in the storage phosphor panel according to the present invention comprises said binder comprises an acrylate type polymer. More preferably said binder comprises a urethane acrylate. A coating dispersion is prepared therefore, composed of a urethane acrylate oligomer and an acrylate oligomer, which both, together, form the binder of the said protective layer and which are present in a ratio by weight of at least 2:1, more preferably about 7:3 and which together represent at least 80%, and even up to 90% by weight of the total amount of the protective layer. Well-known urethane acrylate and acrylate oligomers are GENOMEER T1600, trade name product from RAHN, Switzerland, and SERVOCURE RTT190, trade name product available from SERVO DELDEN BV, The Netherlands.

A flow modifying agent, a surfactant and a photo initiator are further added, together with the white pigment, the presence of which is essential in order to reach the objects of the present invention.

A more detailed description about the composition of the said protective overcoat layer can be found in the Examples hereinafter.

The roughness of the topcoat layer of the radiation image storage phosphor screens or panels according to the present invention offers the advantage that transport in the read-out apparatus is improved in that no sliding phenomena occur so that the panel is not positioned in the right way or, even worse, that the plate jams in the apparatus, so that no image can be retrieved and that a retake has to be made. Pigmenting a protection layer having a certain roughness in order to improve sharpness can also lead to an increase of screen structure noise, visible in the diagnostic image. However it has unexpectedly been found that, if the degree of pigmenting is optimized in relation to the roughness of the protection coating, a sharpness increase can be reached without encountering the disadvantage of an increase of the visible screen structure noise. Desirable and unexpected properties of ease of manipulation and excellent image quality (improved sharpness without screen structure noise increase) are thus combined by application of the features of the present invention. Correlating features of roughness and thickness of the protective coating conferring to the screens of the present invention have been described in the EP-A 0 510 754.

In order to further fulfill the requirement to prevent scattering of irradiation or rays having a stimulating energy for the storage phosphors coated in the phosphor layer(s) of the storage panel according to the present invention, the coating of a colorant having an absorption as high as possible in the wavelength range of the stimulating rays and an absorption as low as possible in the wavelength range of the emitted radiation may be additionally applied, as has been described in EP-A 0 866 469 and the corresponding U.S. Pat. No. 5,905,014. Triarylmethane dyes having at least one aqueous alkaline soluble group as perfectly suitable dyes for those purposes can advantageously be used. Particularly preferred therein are substituted triarylmethane dyes having a relatively high solubility in protic or polar solvents as alcohol as no diffusion to an adjacent phosphor layer, coated from a polar solvents, occurs. The radiation image storage panel of the invention may thus have at least one of the layers colored with a colorant which does not absorb the stimulated emission but the stimulating rays.

In order to have reflecting properties the support material may itself comprise $TiO_2$ (anatase) particles, or $BaSO_4$ particles.

In another embodiment the said particles are incorporated in a hardened layer coated onto a support. Said hardenened layers which should be considered also as intermediate layers between support and phosphor layer may comprise one or more colorant(s) in order to provide a storage panel showing the desired sharpness properties. The presence under the phosphor layer(s) of the reflecting layers set forth above, whether or not comprising the (preferably blue) colorants, is in favour of screen speed. Although such reflectance properties could be expected to be disadvantageous with respect to sharpness, it has been established that this speed increase or speed compensation of loss of speed due to the optional presence of antihalation dyes is not disadvantageous with respect to image resolution.

Another light-reflecting layer which can be provided in order to enhance the output of light emitted by photostimulation is a (vacuum-deposited) aluminum layer. In terms of reflection a dye or colorant should have a mean reflectance in the wavelength region of the stimulating rays for said stimulating phosphor that is lower than the mean reflectance in the wavelength region of the light emitted by said stimulable phosphor upon stimulation thereof.

In another embodiment a dye(s) or colorant(s) can additionally be present in the phosphor layer itself: it is recommended however, if applied, to add lower amounts of said dyes than in an intermediate layer and/or in the support in order to overcome speed decrease.

In still another embodiment a dye(s) or colorant(s) can additionally be present in the protective layer coated on top of the phosphor layer itself: in that case it is recommended, if applied, to add still lower amounts of said dyes than in the phosphor layer, and correspondingly much lower amounts of said dyes in the intermediate layer, in order to prevent further loss in speed of the said screen. Nevertheless its presence is particularly useful when due to light-piping stimulation light enters the protecting overcoat layer, causing thereby unsharpness.

In the phosphor layer an increase in the volume ratio of phosphor to binder further provides a reduction of the thickness of the coating layer for an equal phosphor coverage and in addition not only provides a better sharpness but also offers a higher speed or sensitivity. An extra improvement in image-sharpness can be realized with the thermoplastic rubber binders cited in WO94/0531 because thinner phosphor layers are possible at a higher phosphor to binder ratio. Rubbery binders are preferably chosen because they allow a high volume ratio of pigment to binder, resulting in excellent physical properties and image quality and in an enhanced speed. In that case a small amount of binding agent does not result in brittle layers and minimum amounts of binder in the phosphor layer give enough structural coherence to the layer.

Especially for storage phosphor members this factor is very important in view of the manipulations said member is exposed to. The weight ratio of phosphor to binder preferably from 80:20 to 99:1. The ratio by volume of phosphor to binding medium is preferably more than 85/15. In this connection a volume ratio of phosphor to binder higher than 92/8 is hardly allowable and is about a maximum value of said volume ratio. A mixture of one or more thermoplastic rubber binders may be used in the coated phosphor layer(s): preferably the binding medium substantially consists of one or more block copolymers, having a saturated elastomeric midblock and a thermoplastic styrene endblock, as rubbery and/or elastomeric polymers as disclosed in WO 94/00530. Particularly suitable thermoplastic rubbers, used as block-copolymeric binders in phosphor screens in accordance with the present invention are the KRATON-G rubbers, KRATON being a trade mark name from SHELL, The Netherlands. The phosphor layer preferably has a bound polar functionality of at least 0.5%, a thickness in the range from 10 to 1000 μm and a ratio by volume of 92:8 or less.

In the radiation image storage panel of the present invention the said phosphor particles are dispersed in a binding medium, being a polymeric binder, wherein said phosphor particles are present in a volume ratio of at least 80/20. Further in the panel according to the present invention, said polymeric binder is at least one member selected from the group consisting of vinyl resins, polyesters, polyurethane resins and thermosplastic rubbers (like e.g. KRATON rubbers, more particularly KRATON FG 1901, trademarked product from SHELL, The Netherlands). Apart therefrom the binder employable for the protective film is not specifically restricted. Examples of the binder materials include polyethylene terephthalate, polyethylene naphthalate, polyamide, aramid, and fluororesin(fluorocarbon resin). Preferred is an organic solvent-soluble fluorocarbon resin, which is a polymer of fluoro-olefin (olefin containing fluorine) or a copolymer comprising fluoro-olefin component. Examples of the fluorocarbon resin include poly (tetrafluoroethylene), poly(chlorotrifluoroethylne), polyvinyl fluoride, polyvinylidene fluoride, copolymer of tetrafluoroethylene and hexafluoropropylene, and copolymer of fluoro-olefin and vinyl ether. The fluorocarbon resin may be used in combination with other resins described above, and may contain an oligomer having polysiloxane structure or perfluoroalkyl group. Further, the fluororesin may be crosslinked with a crosslinking agent. The surface protective film can be formed by the steps of dispersing the scattering white pigment particles in an organic solution of the binder resin to prepare a coating liquid, applying the liquid onto the phosphor layer directly or via a desired auxiliary layer, and then drying the applied liquid to form the protective film. The surface protective film may be formed by other steps, for instance, applying the coating liquid onto a temporary support, drying the applied liquid to form a protective film, peeling off the protective film from the temporary support, and then providing the protective film with an adhesive onto the phosphor layer directly or via a desired auxiliary layer. The protective film generally contains the white pigment particles in an amount of 0.5 to 10 wt. %, preferably 0.5 to 5 wt. %. For improving dispersibility, the pigment particles may be subjected to surface pretreatment and the film may contain known dispersing agents (e.g., surface active agent type, titanate coupling agent type, aluminate coupling agent type) and/or other various additives such as silicon surface active agent and fluorine surface active agent. The thickness of the protective film generally is in the range of 1 to 20 μm, preferably 3 to 10 μm.

Storage panels as described hereinbefore, according to this invention, may be provided with at least one antioxidant preventing yellowing of the screen. The antioxidant(s) is(are) preferably incorporated in the phosphor layer. The coating dispersion may further contain a filler (reflecting or absorbing).

As is well-known the sensitivity of the screen is determined by the chemical composition of the phosphor, its crystal structure and crystal size properties and the weight amount of phoshor coated in the phosphor layer. The image quality, particularly sharpness, especially depends on optical scattering phenomena in the phosphor layer being determined mainly besides the already mentioned thickness of the phosphor layer by the packing density. Said packing density of the phosphor particles depends on the crystal size distribution of the phosphor particles, their morphology and the amount of binder present in the phosphor layer or layers.

It is clear that within the scope of this invention the choice of the phosphor(s) or phosphor mixture(s) is limited in that the radiation image storage panel has a wavelength region of the stimulating rays situated between 500 and 700 nm.

Further in a preferred embodiment according to the present invention said radiation image storage panel has a wavelength region of the light emitted by said stimulable phosphor upon stimulation thereof situated between 350 and 450 nm.

In the radiation image storage panel according to the present invention said phosphor particles preferably have a composition selected from the group consisting of BaFBr:Eu or CsBr:Eu type stimulable phosphors.

In one embodiment radiation image storage panels according to the present invention divalent europium-doped bariumfluorohalide phosphors are used, wherein the halide-containing portion may be (1) stoichiometrically equivalent with the fluorine portion as e.g. in the phosphor described in U.S. Pat. No. 4,239,968, (2) may be substoichiometrically present with respect to the fluorine portion as described e.g. in EP-A 0 021 342 or 0 345 904 and U.S. Pat. No. 4,587,036, or (3) may be superstoichiometrically present with respect to the fluorine portion as described e.g. in U.S. Pat. No. 4,535,237.

BaFBr:Eu type phosphors further include europium activated barium-strontium-magnesium fluorobromide containing an effective amount of both strontium and magnesium as in EP-A 0 254 836; europium-doped barium fluorohalide photostimulable phosphor comprising an amount of oxygen sufficient to create a concentration of anion vacancies effective to substantially increase the stored photostimulable energy, compared to a non-oxygen-treated phosphor described in U.S. Pat. Nos. 5,227,254 and 5,380,599; and divalent europium activated barium fluorobromide containing as codopant samarium, and wherein the terminology barium fluorobromide stands for an empirical formula wherein (1) a minor part of the barium (less than 50 atom %) is replaced optionally by at least one metal selected from the group consisting of a monovalent alkali metal, a divalent alkaline earth metal other than barium, and a trivalent metal selected from the group consisting of Al, Ga, In, Tl, Sb, Bi, Y, and a rare earth metal selected from the group consisting of Ce, Pr, Nd, Gd, Tb, Dy, Ho, Er, Tm, Yb and Lu, (2) a minor part (less than 50 atom %) of the bromine is replaced by chlorine, and/or iodine, and (3) wherein fluorine is present stoichiometrically in a larger atom % than bromine taken alone or bromine combined with chlorine and/or iodine as in U.S. Pat. No. 5,547,807; as well as the phosphors disclosed in the radiation image recording and reproducing methods described in EP-A's 0 111 892, 0 111 893.

The phosphor set forth in U.S. Pat. No. 4,239,968 is e.g. a phosphor selected from the group of alkaline earth metal fluorohalide phosphors and can be used for recording and reproducing a radiation image in the present invention, following the steps described there of (i) causing a visible ray- or infrared ray-stimulable phosphor to absorb a radiation passing through an object, and (ii) stimulating said phosphor with stimulation rays selected from visible rays and infrared rays to release the energy of the radiation stored therein as fluorescent light, characterized in that said phosphor is at least one phosphor selected from the group of alkaline earth metal fluorohalide phosphors. From the stimulation spectrum of said phosphors it can be learned that said kind of phosphor has high sensitivity to stimulation light of a He—Ne laser beam (633 nm) but poor photostimulability below 500 nm. The stimulated light (fluorescent light) is situated in the wavelength range of 350 to 450 nm with a peak at about 390 nm (ref. the periodical Radiology, September. 1983, p.834.). It can further be learned from said U.S. Pat. No. 4,239,968 that it is desirable to use a visible ray (e.g. red light) stimulable phosphor rather than an infra-red ray-stimulable phosphor because the traps of an infra-red-stimulable phosphor are shallower than these of the visible ray-stimulable phosphor and, accordingly, the radiation image storage panel comprising the infra-red ray-stimulable phosphor exhibits a relatively rapid dark-decay (fading). For solving that problem it is desirable as explained in the same U.S. Pat. No. 4,239,968 to use a photostimulable storage phosphor which has traps as deep as possible to avoid fading and to use for emptying said traps light rays having substantially higher photon energy (rays of short wavelength).

Attempts have been made to formulate phosphor compositions showing a stimulation spectrum in which the emission intensity at the stimulation wavelength of 500 nm is higher than the emission intensity at the stimulation wavelength of 600 nm. A suitable phosphor for said purpose, which is also suitable for use in the present invention has been described in U.S. Pat. No. 4,535,238 in the form of a divalent europium activated barium fluorobromide phosphor having the bromine-containing portion stoichiometrically in excess of the fluorine. According to that U.S. Pat. No. 4,535,238 the photostimulation of the phosphor can proceed effectively with light, even in the wavelength range of 400 to 550 nm.

Although BaFBr:$Eu^{2+}$ storage phosphors, used in digital radiography, have a relatively high X-ray absorption in the range from 30–120 keV, which is a range relevant for general medical radiography, the absorption is lower than the X-ray absorption of most prompt-emitting phosphors used in screen/film radiography, like e.g. LaOBr:Tm, $Gd_2O_2S$:Tb and $YTaO_4$:Nb. Therefore, said screens comprising light-emitting luminescent phosphors will absorb a larger fraction of the irradiated X-ray quanta than BaFBr:Eu screens of equal thickness. The signal to noise ratio (SNR) of an X-ray image being proportional to the square-root of the absorbed X-ray dose, the images made with the said light-emitting screens will consequently be less noisy than images made with BaFBr:Eu screens having the same thickness. A larger fraction of X-ray quanta will be absorbed when thicker BaFBr:Eu screens are used. Use of thicker screens, however, leads to diffusion of light over larger distances in the screen, which causes deterioration of image resolution. For this reason, X-ray images made with digital radiography, using BaFBr screens, as disclosed in U.S. Pat. No. 4,239,968, give a more noisy impression than images made with screen/film radiography. A more appropriate way to increase the X-ray absorption of phosphor screens is by increasing the intrinsic absorption of the phosphor. In BaFBr:Eu storage phosphors this can be achieved by partly substituting bromine by iodine. BaFX:Eu phosphors containing large amounts of iodine have been described e.g. in EP-A 0 142 734. Therefore, in a phosphor as disclosed in EP-A 0 142 734, the gain in image quality, due to the higher absorption of X-rays when more than 50% of iodine is included in the phosphor is offset by the lowering of the relative luminance.

Divalent europium activated barium fluorobromide phosphors suitable for use according to the present invention have further been described in EP-A 0 533 236 and in the corresponding U.S. Pat. Nos. 5,422,220 and 5,547,807. In the said EP-A 0 533 236 a divalent europium activated stimulable phosphor is claimed wherein the stimulated light has a higher intensity when the stimulation proceeds with light of 550 nm, than when the stimulation proceeds with light of 600 nm. It is said that in said phosphor a "minor part" of bromine is replaced by chlorine and/or iodine. By minor part has to be understood less than 50 atom %.

Still other divalent europium activated barium fluorobromide phosphors suitable for use in screens or panels according to the present invention have been described in EP-A 0 533 234. In that EP-A 0 533 234 a process is described to prepare europium-doped alkaline earth metal fluorobromide phosphors, wherein fluorine is present in a larger atom % than bromine, and which have a stimulation spectrum that is clearly shifted to the shorter wavelength region. Therein use of shorter wavelength light in the photostimulation of phosphor panels containing phosphor particles dispersed in a binder is in favour of image-sharpness since the diffraction of stimulation light in the phosphor-binder layer containing dispersed phosphor particles acting as a kind of grating will decrease with decreasing wavelength. As is apparent from the examples in this EP-A 0 533 234 the ultimately obtained phosphor composition determines the optimum wavelength for its photostimulation and, therefore, the sensitivity of the phosphor in a specific scanning system containing a scanning light source emitting light in a narrow wavelength region.

Other preferred photostimulable phosphors according to the applications mentioned hereinbefore contain an alkaline earth metal selected from the group consisting of Sr, Mg and Ca with respect to barium in an atom percent in the range of 0.1 to 20 at %. From said alkaline earth metals Sr is most preferred for increasing the X-ray conversion efficiency of the phosphor. Therefore in a preferred embodiment strontium is recommended to be present in combination with barium and fluorine stoichiometrically in larger atom % than bromine alone or bromine combined with chlorine and/or iodine. Other preferred photostimulable phosphors mentioned in that application contain a rare earth metal selected from the group consisting of Ce, Pr, Nd, Gd, Tb, Dy, Ho, Er, Tm, Yb and Lu with respect to barium in an atom percent in the range of $10^{-3}$ to $10^{-1}$ at %. From said rare earth metals Gd is preferred for obtaining a shift of the maximum of the photostimulation spectrum of the phosphor to the shorter wavelengths.

The preferred phosphors of that application referred to hereinbefore are also advantageously used in the present invention the proviso that, as set forth hereinbefore, the wavelength region of the stimulating rays is between 500 and 700 nm.

Still other preferred photostimulable phosphors for use according to the present invention contain a trivalent metal selected from the group consisting of Al, Ga, In, Tl, Sb, Bi and Y with respect to barium in an atom percent in the range of $10^{-1}$ to 10 at %. From said trivalent metals Bi is preferred for obtaining a shift of the maximum of the photostimulation spectrum of the phosphor to the shorter wavelengths.

Preferred phosphors for use according to this invention are further phosphors wherein fluorine is present stoichiometrically in a larger atom % than bromine taken alone or bromine combined with chlorine and/or iodine, e.g. fluorine is present in 3 to 12 atom % in excess over bromine or bromine combined with chlorine and/or iodine.

Still other particularly suitable barium fluorobromide phosphors for use according to the present invention contain in addition to the main dopant $Eu^{2+}$ at least Sm as codopant as described in EP-A 0 533 233 and in the corresponding U.S. Pat. No. 5,629,125.

Still other useful phosphors are those wherein Ba-ions are partially replaced by Ca-ions at the surface of the phosphors have been described in EP-A 0 736 586.

In digital radiography it can be advantageous to use photostimulable phosphors that can very effectively be stimulated by light with wavelength higher than 600 nm as for phosphors included for use in storage panels according to the present invention, since then the choice of small reliable lasers that can be used for stimulation (e.g. He—Ne, semi-conductor lasers, solid state lasers, etc) is very great so that the laser type does not dictate the dimensions of the apparatus for reading (stimulating) the stimulable phosphor screen.

More recently stimulable phosphors, giving a better signal-to-noise ratio, a higher speed, further being stimulable at wavelengths above 600 nm have therefore been described in U.S. Pat. Nos. 5,853,946 and 6,045,722. Therein a storage phosphor class has been described providing high X-ray absorption, combined with a high intensity of photostimulated emission, thus allowing to build a storage phosphor system for radiography yielding images that have at the same time a high sharpness and a low noise content, through a decreased level of X-ray quantum noise and a decreased level of fluorescence noise. Further said class of photostimulable phosphors provides a high X-ray absorption, combined with a high intensity of photostimulated emission, showing said high intensity of photostimulated emission when stimulated with light having a wavelength above 600 nm. Said photostimulable phosphors can further be used in panels for medical diagnosis, whereby the dose of X-ray administered to the patient can be lowered and the image quality of the diagnostic image enhanced: in a panel including said phosphor in dispersed form on photostimulation with light in the wavelength range above 600 nm images with very high signal-to-noise ratio are yielded.

A very useful and preferred method for the preparation of stimulable phosphors can be found in Research Disclosure Volume 358, February 1994 p 93 item 35841. In order to produce phosphors with a constant composition and, therefore, with a constant stimulation spectrum for use in storage phosphor panels, even in the presence of co-dopants that influence the position of the stimulation spectrum as e.g. samarium or an alkali metal, added to the raw mix of base materials in small amounts as prescribed in EP-A 0 533 234, a solution therefore has been proposed in U.S. Pat. No. 5,517,034. Therein a method of recording and reproducing a penetrating radiation image has been proposed comprising the steps of:

(i) causing stimulable storage phosphors to absorb said penetrating radiation having passed through an object or emitted by an object and to store energy of said penetrating radiation, (ii) stimulating said phosphors with stimulating light to release at least a part of said stored energy as fluorescent light and (iii) detecting said stimulation light, characterized in that said phosphors consist of a mixture of two or more individually prepared divalent europium doped bariumfluorohalide phosphors at least one of which contains (a) co-dopant(s) which co-determi-ne(s) the character of the stimulation spectrum of the co-doped phosphor.

Further particularly suitable divalent europium barium fluorobromide phosphors for use according to that invention correspond to the empirical formula (I) of EP-A 0 533 236 and contain in addition to the main dopant $Eu^{2+}$ at least one alkali metal, preferably sodium or rubidium, as a co-dopant. Preferred photostimulable phosphors according to that application contain samarium with respect to barium in an atom percent in the range of $10^{-3}$ to 10 at %. Other preferred photostimulable phosphors according to that application contain an alkali metal selected from the group consisting of Li, Na, K, Rb and Cs, with respect to barium in an atom percent in the range of $10^{-2}$ to 1 at %.

In praxis a maximum in the stimulation spectrum for e.g. lithium fluxed stimulable europium activated bariumfluorohalide phosphor can be found between 520 and 550 nm, whereas for cesium fluxed phosphor its maximum is situated between 570 and 630 nm. Maxima for the stimulation spectra of said phosphors after making a mixture thereof can be found at intermediate wavelengths. The stimulation spectrum of said mixture is further characterized in that the emission intensity at 500 nm stimulation is always lower than the emission intensity at 600 nm. The broadening of the obtained stimulation spectra is a further advantage resulting from the procedure of making blends in that the storage panel in which the stimulable phosphors are incorporated is sensitive to a broad region of stimulation wavelengths in the visible range of the wavelength spectrum. As a consequence the storage panel comprising a layer with the phosphor blends described hereinbefore may offer universal application possibilities from the point of view of stimulation with different stimulating light sources. Different stimulating light sources that may be applied are those that have been described in Research Dislosure No. 308117, December 1989.

Coverage of the phosphor or phosphors present as a sole phosphor or as a mixture of phosphors whether or not differing in chemical composition and present in one or more phosphor layer(s) in a screen is preferably in the range from about 50 g to 2500 g, more preferably from 200 g to 1750 g and still more preferably from 300 to 1500 g/$m^2$. Said one or more phosphor layers may have the same or a different layer thickness and/or a different weight ratio amount of pigment to binder and/or a different phosphor particle size or particle size distribution. It is general knowledge that sharper images with less noise are obtained with phosphor particles of smaller mean particle size, but light emission efficiency declines with decreasing particle size. Thus, the optimum mean particle size for a given application is a compromise between imaging speed and image sharpness desired. Preferred average grain sizes of the phosphor particles are in the range of 2 to 30 $\mu$m and more preferably in the range of 2 to 20 $\mu$m, in particular for BaFBr:Eu type phosphors.

In the phosphor layer(s), any phosphor or phosphor mixture may be coated depending on the objectives that have to be attained with the manufactured storage phosphor screens. Besides mixing fine grain phosphors with more coarse grain phosphors in order to increase the packing density, a gradient of crystal sizes may, if required, be build up in the storage panel. Principally this may be possible by coating only one phosphor layer, making use of gravitation forces, but with respect to reproducibility at least two different storage panels coated from phosphor layers comprising phosphors or phosphor mixtures in accordance with the present invention may be coated in the presence of a suitable binder, the layer nearest to the support consisting essentially of small phosphor particles or mixtures of different batches thereof with an average grain size of about 5 $\mu$m or less and thereover a mixed particle layer with an average grain size from 5 to 20 $\mu$m for the coarser phosphor particles, the smaller phosphor particles optionally being present as interstices of the larger phosphor particles dispersed in a suitable binder. Depending on the needs required the stimulable phosphors in accordance with the present invention or mixtures thereof may be arranged in a variable way in these coating constructions.

In another preferred embodiment according to the present invention the storage phosphor is used in binderless phosphor screens and is an alkali metal phosphor, and, more preferably a CsBr:Eu type phosphor.

Very suitable phosphors of that type are phosphors according to the general formula (I)

$$M^{1+}X.aM^{2+}X'_2bM^{3+}X''_3{:}cZ \quad (I)$$

wherein:

$M^{1+}$ is at least one member selected from the group consisting of Li, Na, K, Cs and Rb, $M^{2+}$ is at least one member selected from the group consisting of Be, Mg, Ca, Sr, Ba, Zn, Cd, Cu, Pb and Ni, $M^{3+}$ is at least one member selected from the group consisting of Sc, Y, La, Ce, Pr, Nd, Pm, Sm, Eu, Gd, Tb, Dy, Ho, Er, Tm, Yb, Lu, Al, Bi, In and Ga, Z is at least one member selected from the group $Ga^{1+}$, $Ge^{2+}$, $Sn^{2+}$, $Sb^{3+}$ and $As^{3+}$, X, X' and X" can be the same or different and each represents a halogen atom selected from the group consisting of F, Br, Cl, I and $0 \leqq a \leqq 1$, $0 \leqq b \leqq 1$ and $0 < c \leqq 0.2$. Such phosphors have been disclosed in, e.g., U.S. Pat. No. 5,736,069.

Highly preferred phosphors for use in a binderless phosphor screen of this invention are CsX:Eu stimulable phosphors, wherein X represents a halide selected from the group consisting of Br and Cl prepared by a method comprising the steps of:

mixing said CsX with between $10^{-3}$ and 5 mol % of an Europium compound selected from the group consisting of $EuX'_2$, $EuX'_3$ and EuOX', X' being a member selected from the group consisting of F, Cl, Br and I, firing said mixture at a temperature above 450° C.

cooling said mixture and recovering the CsX:Eu phosphor.

In the present invention such needle-shaped phosphor are thus suitable for use in the storage phosphor panels. A preferred example is a CsX:Eu stimulable phosphor, wherein X represents a halide selected from the group consisting of Br and Cl is used, prepared by a method comprising the steps of mixing said CsX with between $10^{-3}$ and 5 mol % of an Europium compound selected from the group consisting of $EuX'_2$, $EuX'_3$ and EuOX', X' being a member selected from the group consisting of F, Cl, Br and I; firing said mixture at a temperature above 450° C. cooling said mixture and recovering the CsX:Eu phosphor.

The method for preparing a binderless phosphor screen using these phosphors and a method for recording and reproducing an X-ray image using such screens can be used in the context of the present invention as described in WO01/3156 and in U.S. application Ser. No. 01/059,004.

A factor determining the sensitivity of the screen is the thickness of the phosphor layer, being proportional to the amount of phosphor(s) coated. Said thickness may be within the range of from 1 to 1000 $\mu$m, preferably from 50 to 500 $\mu$m and more preferably from 100 to 300 $\mu$m. In case however that needle-shaped CsBr:Eu type phosphors are used, the phosphor layer may even be up to 1000 $\mu$m as has been set out in EP-A 1 113 458. Therein a binderless storage phosphor screen with needle shaped crystals is prepared, wherein the phosphor is an alkali halide phosphor and the needles show high [100] unit cell orientation in the plane of the screen in order to provide a stimulable phosphor screen useful in an X-ray recording system with a very good compromise between speed of the recording system (i.e. as low as possible patient dose) with an image with high sharpness and low noise.

An image storage phosphor screen or panel according to the present invention can be prepared by the following manufacturing process. The phosphor layer can be applied to the support by any coating procedure, making use of solvents for the binder of the phosphor containing layer as well as of useful dispersing agents, useful plasticizers, useful fillers and subbing or interlayer layer compositions that have been described in extenso in the EP-A 0 510 753. Phosphor particles may be mixed with dissolved rubbery and/or elastomeric polymers, in a suitable mixing ratio in order to prepare a dispersion. Said dispersion is uniformly applied to a substrate by a known coating technique as e.g. doctor blade coating, roll coating, gravure coating or wire bar coating, and dried to form a storage phosphor layer. Further mechanical treatments like compression to lower the void ratio is not required within the scope of the present invention.

Useful dispersing agents to improve the dispersibility of the phosphor particles dispersed into the coating dispersion are described in EP-A 0 510 753 as well as a variety of additives that can be added to the phosphor layers such as a plasticizer for increasing the bonding between the binder and the phosphor particles in the phosphor layer and, according to the present invention, to a light-reflecting or absorbing filler and/or a colorant.

Useful plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; polymeric plastizers, e.g. and polyesters of polyethylene glycols with aliphatic dicarboxylic acids such as polyester of triethylene glycol with adipic acid and polyester of diethylene glycol with succinic acid.

The stimulable phosphor is preferably protected against the influence of moisture by adhering thereto chemically or physically a hydrophobic or hydrophobizing substance. Suitable substances for said purpose are described e.g. in U.S. Pat. No. 4,138,361.

In the composition of a storage panel, one or more additional layers are occasionally provided between the support and the phosphor containing layer, having subbing or interlayer layer compositions, in order to improve the bonding between the support and the phosphor layer, or in order to improve the sensitivity of the screen or the sharpness and resolution of an image provided thereby. For instance, a subbing layer or an adhesive layer may be provided by coating polymer material over the surface of the support on the phosphor layer side.

Additional layer(s) may be coated on the support either as a backing layer or interposed between the support and the intermediate layer, the said intermediate layer and the phosphor containing layer(s). Several of said additional layers may be applied in combination.

In the preparation of the phosphor screen having a primer layer between the substrate and the layer containing the phosphor(s), the primer layer is provided on the substrate beforehand, and then the phosphor dispersion is applied to the primer layer and dried to form the fluorescent layer.

When the phosphors are used in combination with a binder to prepare a screen or a panel according to the present invention, the phosphor particles are intimately dispersed in a solution of the binder and then coated on the support and dried. The coating of the present phosphor binder layer may proceed according to any usual technique, e.g. by spraying, dip-coating or doctor blade coating. After coating, the solvent(s) of the coating mixture is (are) removed by evaporation, e.g. by drying in a hot (60° C.) air current.

An ultrasonic treatment can be applied to improve the packing density and to perform the de-aeration of the phosphor-binder combination. Before the optional application of a protective coating the phosphor-binder layer may be calendered to improve the packing density (i.e. the number of grams of phosphor per $cm^3$ of dry coating).

After applying the coating dispersion onto the support, the coating dispersion is heated slowly to dryness in order to complete the formation of a phosphor layer. In order to remove as much as possible entrapped air in the phosphor coating composition it can be subjected to an ultra-sonic treatment before coating.

After the formation of the phosphor layer, a protective layer is generally provided on top of the fluorescent layer.

Correlating features of roughness and thickness of the protective coating conferring to the screens or panels of the present invention having desirable and unexpected properties of ease of manipulation and excellent image sharpness have been described in the EP-A 0 510 754.

According to a preferred embodiment of the present invention the protective coating is provided by means of screen printing (silk-screen printing).

The protective coating composition may be applied by a rotary screen printing device as has been described in detail in the said EP-A 0 510 753. Very useful radiation curable compositions for forming a protective coating contain as primary components:

(1) a crosslinkable prepolymer or oligomer, or even combined with a polymer that is soluble in the reactive diluent monomer.

(2) a reactive diluent monomer, and in the case of an UV curable formulation (3) a photoinitiator.

Examples of suitable prepolymers for use in a radiation-curable composition applied to the storage panel according to the present invention are the following: unsaturated polyesters, e.g. polyester acrylates; urethane modified unsaturated polyesters, e.g. urethane-polyester acrylates. Liquid polyesters having an acrylic group as a terminal group, e.g. saturated copolyesters which have been provided with acryl-type end groups are described in published EP-A 207 257 and Radiat. Phys. Chem., Vol. 33, No. 5, 443–450 (1989). The latter liquid copolyesters are substantially free from low molecular weight, unsaturated monomers and other volatile substances and are of very low toxicity (ref. the journal Adhasion 1990 Heft 12, page 12). The preparation of a large variety of radiation-curable acrylic polyesters is given in German Offenlegungsschrift No. 2838691. Mixtures of two or more of said prepolymers may be used. A survey of UV-curable coating compositions is given e.g. in the journal "Coating" 9/88, p. 348–353.

When the radiation-curing is carried out with ultraviolet radiation (UV), a photoinitiator is present in the coating composition to serve as a catalyst to initiate the polymerization of the monomers and their optional cross-linking with the pre-polymers resulting in curing of the coated protective layer composition. A photosensitizer for accelerating the effect of the photoinitiator may be present. Photoinitiators suitable for use in UV-curable coating compositions belong to the class of organic carbonyl compounds, for example, benzoin ether series compounds such as benzoin isopropyl, isobutylether; benzil ketal series compounds; ketoxime esters; benzophenone series compounds such as benzophenone, o-benzoylmethylbenzoate; acetophenone series compounds such as acetophenone, trichloroacetophenone, 1,1-dichloroacetophenone, 2,2-diethoxyacetophenone, 2,2-dimethoxy-2-phenylacetophenone; thioxanthone series compounds such as 2-chlorothioxanthone, 2-ethylthioxanthone; and compounds such as 2-hydroxy-2-methylpropiophenone, 2-hydroxy-4'-isopropyl-2-methylpropiophenone, 1-hydroxycyclohexylphenylketone, etc.

A particularly preferred photoinitiator is 2-hydroxy-2methyl-1-phenyl-propan-1-one which product is marketed by E. Merck, Darmstadt, Germany, under the tradename DAROCUR 1173. The above mentioned photopolymerisation initiators may be used alone or as a mixture of two or more. Examples of suitable photosensitizers are particular aromatic amino compounds as described e.g. in GB-A 1,314,556, 1,486,911, U.S. Pat. No. 4,255,513 and merocyanine and carbostyril compounds as described in U.S. Pat. No. 4,282,309.

When using ultraviolet radiation as curing source the photoinitiator which should be added to the coating solution will to a more or less extent also absorb the light emitted by the phosphor thereby impairing the sensitivity of the radiographic screen, particularly when a phosphor emitting UV or blue light is used. Electron beam curing may therefore be more effective.

The protective coating of the present storage panel is given an embossed structure following the coating stage by passing the uncured or slightly cured coating through the nip of pressure rollers wherein the roller contacting said coating has a micro-relief structure, e.g. giving the coating an embossed structure so as to obtain relief parts as has been described e.g. in EP-A's 455 309 and 456 318.

A suitable process for forming a textured structure in a plastic coating by means of engraved chill roll is described in U.S. Pat. No. 3,959,546. According to another embodiment the textured or embossed structure is obtained already in the coating stage by applying the paste-like coating composition with a gravure roller or screen printing device operating with a radiation-curable liquid coating composition the Hoeppler-viscosity of which at a coating temperature of 25° C. is between 450 and 20,000 mPa.s.

To avoid flattening of the embossed structure under the influence of gravitation, viscosity and surface shear the radiation-curing is effected immediately or almost immediately after the application of the liquid coating. The rheologic behaviour or flow characteristics of the radiation-curable coating composition can be controlled by means of so-called flowing agents. For that purpose alkylacrylate ester copolymers containing lower alkyl (C1–C2) and higher alkyl (C6–C18) ester groups can be used as shear controlling agents lowering the viscosity. The addition of pigments such as colloidal silica raises the viscosity.

A variety of other optional compounds can be included in the radiation-curable coating composition of the present storage phosphor panel such as compounds to reduce static electrical charge accumulation, plasticizers, matting agents, lubricants, defoamers and the like as has been described in EP-A 0 510 753. In that document a description has also been given of the apparatus and methods for curing, as well as a non-limitative survey of X-ray conversion screen phosphors, of photostimulable phosphors and of binders of the phosphor containing layer.

The edges of the screen, being especially vulnerable by multiple manipulation, may be reinforced by covering the edges (side surfaces) with a polymer material being formed essentially from a moisture-hardened polymer composition prepared according to EP-A 0 541 146.

Support materials for radiographic screens which in accordance with specific embodiments of the present invention are preferably plastic films such as films of cellulose acetate, polyvinyl chloride, polyvinyl acetate, polyacrylonitrile, polystyrene, polyester, polyethylene terephthalate, polyethylene naphthalate, polyamide, polyimide, cellulose triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like.

Examples of preferred supports include polyethylene terephthalate, clear or blue colored or black colored (e.g., LUMIRROR C, type X30 supplied by Toray Industries, Tokyo, Japan), polyethylene terephthalate filled with $TiO_2$ or with $BaSO_4$. Metals as e.g. aluminum, bismuth and the like may be deposited e.g. by vaporization techniques to get a polyester support having radiation-reflective properties.

These supports may have thicknesses which may differ depending on the material of the support, and may generally be between 50 and 1000 $\mu$m, more preferably between 80 and 500 $\mu$m depending on handling properties. Further are mentioned glass supports and metal supports.

Normally the screens described hereinbefore are applied for medical X-ray diagnostic applications but according to a particular embodiment the present radiographic screens may be used in non-destructive testing (NDT), of metal objects, where more energetic X-rays and γ-rays are used than in medical X-ray applications. Especially in the said applications further glass and metal supports are used, the latter preferably of high atomic weight, as described e.g. in U.S. Pat. Nos. 3,872,309 and 3,389,255.

According to a particular embodiment for industrial radiography the image-sharpness of the phosphor screen is improved by incorporating in the phosphor screen between the phosphor-containing layer and the support and/or at the rear side of the support a pigment-binder layer containing a non-fluorescent pigment being a metal compound, e.g. salt or oxide of lead, as described in Research Disclosure September 1979, item 18502.

In order to obtain a reasonable signal-to-noise ratio (S/N) the stimulation light should be prevented from being detected together with the fluorescent light emitted on photostimulation of the storage phosphor. Therefore a suitable filter means is used preventing the stimulation light from entering the detecting means, e.g. a photomultiplier tube. Because the intensity ratio of the stimulation light is markedly higher than that of the stimulated emission light, i.e. differing in intensity in the range of $10^4$:1 to $10^6$:1 (see published EP-A 0 007 105, column 5) a very selective filter should be used. Suitable filter means or combinations of filters may be selected from the group of: cut-off filters, transmission bandpass filters and band-reject filters. A survey of filter types and spectral transmittance classification is given in SPSE Handbook of Photographic Science and Engineering, Edited by Woodlief Thomas, Jr.—A Wiley-Interscience Publication—John Wiley & Sons, New York (1973), p. 264–326.

The fluorescent light emitted by photostimulation is detected preferably photo-electronically with a transducer transforming light energy into electrical energy, e.g. a phototube (photomultiplier) providing sequential electrical signals that can be digitized and stored. After storage these signals can be subjected to digital processing. Digital processing includes e.g. image contrast enhancement, spatial frequency enhancement, image subtraction, image addition and contour definition of particular image parts.

According to one embodiment for the reproduction of the recorded X-ray image the optionally processed digital signals are transformed into analog signals that are used to modulate a writing laser beam, e.g. by means of an acousto-optical modulator. The modulated laser beam is then used to scan a photographic material, e.g. silver halide emulsion film whereon the X-ray image optionally in image-processed state is reproduced.

According to another embodiment the digital signals obtained from the analog-digital conversion of the electrical signals corresponding with the light obtained through photo-stimulation are displayed on a cathode-ray tube. Before display the signals may be processed by computer. Conventional image processing techniques can be applied to reduce the signal-to-noise ratio of the image and enhance the image quality of coarse or fine image features of the radiograph.

The invention is illustrated by the following examples without however limiting it thereto. Important concerning image quality as reflected in S-SWR measuring methods will be described hereinafter in the examples.

EXAMPLES

Definitions and Methods Used

Measurement of sensitivity S and square wave response SWR for the photostimulable phosphor screens coated with BaSrFBr:$Eu^{2+}$ phosphor was carried out with an image scanner made up with a He—Ne laser.

The beam of a 10 mW red He—Ne laser is focussed to a small spot of 140 μm (FWMH) with an optic containing a beamexpander and a collimating lens. A mirror galvanometer is used to scan this small laserspot over the entire width of a phosphor sample. During this scanning procedure the phosphor is stimulated and the emission light is captured by an array of optical fibers which are sited on one line. At the other end of the optical fibers being mounted in a circle a photomultiplier is situated.

To attenuate the stimulating light an optical filter, type BG3 from SCHOTT, is placed between the fiber and the photomultiplier. In this way only the light emitted by the phosphor is measured. The small current of the photomultiplier is first amplified with an I/V convertor and digitalized with an A/D convertor.

The measuring set up is connected with a HP 9826 computer and a HP 6944 multiprogrammer to controll the measurement. Starting the procedure an electronic shutter is closed to shut down the laser.

A phosphor sample measuring 50 mm×200 mm is excited with a 85 kV X-ray source provided with an aluminum filter having a thickness of 21 mm. The radiation dose is measured with a FARMER dosemeter. Between the X-ray source and the phosphor layer a thin lead-raster containing 6 different spatial frequencies is mounted to modulate the X-ray radiation. Frequencies used are 0.50, 1.00, 2.00 and 3.00 line pairs per mm. After exposure the sample is put into the laser scanner. To read out one line the shutter is opened and the galvanometer is moved linearly. During the scanning procedure the emitted light is measured continuously with the A/D convertor at a sampling rate frequency of 100 kHz and stored within a memory card in the multiprogrammer. One scan thus contains 100000 pixels. Once the scan is complete the shutter is closed again and the galvano-meter is put on his original position again.

The data of the scan line are transferred from the memory card in the multiprogrammer to the computer where said data are analysed. A first correction takes into account the sensitivity variation of the scan line with the distance. Therefore a calibration scan was measured previously for a phosphor sample that was exposed quite homogeneously. A second correction takes into account the amount of X-ray dose by dividing said values by the said dose amount.

The different blocks are separated and the amplitude on each spatial frequency is calculated, making use of Fourier analysis. The amplitude of the first block having a spatial frequency of 0.025 line pairs per mm is taken as the sensitivity of the stimulable phosphor screen. The other values are the results for the curve of the Square Wave Response (SWR: SWR1 referring to the response at 1 line pair per mm; SWR2 to the response at 2 line pairs per mm) which is representative for the resolution of the screen.

Composition of the Screens

The coating solution was coated by dipcoating techniques at a rate of 4 m per minute on a polyethylene terephthalate support having reflecting properties (containing $BaSO_4$ particles) or absorbing properties (having carbon black particles.

Thermal curing was performed over one night at 80° C. after drying.

Properties of the thus obtained antihalation layer.

An absorption of 0.31 at a wavelength of 633 nm (HeNe laser emission wavelength). No substantial absorption is measured at the emission wavelength of the stimulable phosphor (having its maximum emission at 390 nm).

Phosphor Layer Composition

STANN JF95B (from SANKYO ORGANIC Chemicals Co. Ltd.) 0.9 g

KRATON FG19101X (from Shell Chemicals) 6.7 g

BaSrFBr:Eu (mean particle size: 7 μm) 300 g

Preparation of the Phosphor Laquer Composition

STANN JF95B and KRATON FG19101X were dissolved while stirring in the prescribed amounts in 63.0 g of a solvent mixture from methylcyclohexane, toluene and butyl acetate in ratios by volume of 50:30:20. The phosphors were added thereafter and stirring was further proceeded for another 10 minutes at a rate of 1700 r.p.m.

The composition was doctor blade coated at a coating rate of 2.5 m per minute onto a subbed 175 μm thick polyethylene terephthalate support and dried at room temperature during 30 minutes. In order to remove volatile solvents as much as possible the coated phosphor plate was dried at 90° C. in a drying oven.

It has been established that a layer composition was obtained having good coating properties.

Composition of the Protective Layers

TiO2-pigmented protective layer

| Ingredient | Comp. wt % | Inv. wt % | Manufactured by |
|---|---|---|---|
| Hexanedioldiacrylaat (HDDA) | 36.1 | 35.8 | UCB |
| Ebecryl 1290 (hexafunctional alifatic urethane acrylate) | 26.3 | 26.1 | UCB |
| Neocryl B-725 (p(BMA-MMA)) | 12.7 | 12.7 | Zeneca |
| Modaflow | 2.3 | 2.2 | Monsanto |
| BaFBr: Eu | 22.6 | 22.4 | AGFA |
| TiO2 (Bayer Titan AN2) | 0 | 0.75 | Bayer |

Three screens having a different filling factor were overcoated by means of screen printing with a TiO2-pigmented (inventive) or non-TiO2-pigmented (comparative) overcoat. Curing of this layer was established by EB-curing at 8 Mrad using 158 kV-radiation.

SWR measurements at 1 and 2 line pairs per mm were made for each screen and a comparison was made for said screens with and without protective overcoat, whether or not being TiO2-pigmented.

Roughness Rz has been determined as the arithmetic average roughness depth value Rt of five different, but subsequent measuring area, wherein said value Rt is defined as the difference in height between the highest “top” and the lowest “valley”. As an instrument suitable for measuring such microscopically fine unevenness, use was made of a “perthometer”, by means of which the surface texture can be measured according to ANSI B46.1-1985 as published by The American Society of Mechanical Engineers. Values at of Rz and Rmax have been expressed in μm.

ΔSWR-values are expressing percentages of decrease in sharpness when comparing SWR-values at 1 and 2 line pairs per mm. In a coating WITH/WITHOUT protective layer, for the comparative, as well as for the inventive storage phosphor screen.

As is clear from the data related with sharpness and roughness for the comparative and for the inventive coating, the decrease in sharpness obtained for the inventive coating having white pigment in is its protective layer is always smaller than in the absence thereof (see summarizing Table hereinafter):

Summarizing Table

Influence of presence of protective layer on image quality (sharpness decrease) for

| Protective layer coated on phosphor layer | comparative Δ SWR 1/2 | comparative Rz/Rmax (μm) | InvenTive Δ SWR 1/2 | InvenTive Rz/Rmax (μm) |
|---|---|---|---|---|
| Example No.1 | 4.1/6.7 | 3.20/4.69 | 2.8/6.1 | 3.21/4.65 |
| Example No.2 | 2.7/6.6 | 6.75/8.76 | 2.1/5.8 | 4.54/5.85 |
| Example No.3 | 4.6/9.5 | 3.30/4.63 | 3.6/8.2 | 3.37/5.34 |

As can further be concluded from Screen No.2 enhanced roughness of the protective coating is not disadvantageous with respect to loss in sharpness: a trend in the opposite direction is even observed! Moreover decrease of sharpness when going from results obtained at 1 l/mm to 2 l/mm is always lower when the protective layer has been pigmented.

Average relative increase in sharpness between the 3 screens with and the 3 screens without pigmented protective layer at different line pairs/mm were 25%, 12%, 2% and 1% for 1, 2, 3 and 4 l/mm respectively.

For screens which have to be transported in a processing machine in order to be read-out as in the present invention said enhanced roughness is moreover highly desired. As sharpness is not negativated the objects of the present invention as set forth before have been fully reached. Moreover screen structure noise has been evaluated as being equal for the comparative as for the inventive screens.

Besides ease of manipulation, an excellent image quality (improved sharpness) for a suitable speed, without screen structure noise increase, is fully attained when applying the features set forth in the present invention.

It should be understood that the above description is intended to be illustrative and not restrictive. Many embodiments will be apparent to those skilled in the art upon reading the above description. The scope of the invention should therefore be determined not with reference to the above description, but should instead be determined with reference to the appended claims, along with the full scope of equivalents to which such claims are entitled. The disclosure of all articles, patents and references, including patent applications and publications are incorporated herein by reference for all purposes.

What is claimed is:

1. Radiation image storage panel comprising a self-supporting or supported layer of storage phosphor particles dispersed in a binding medium and, adjacent thereto, a protective coating characterized in that, besides a binder, the said protective coating comprises a white pigment having a refractive index of more than 1.6, and in that said protective coating has a surface roughness (Rz) between 2 and 10 μm.

2. Radiation image storage panel according to claim 1, wherein said protective coating comprises a white pigment having a refractive index of more than 2.0.

3. Radiation image storage panel according to claim 1, wherein said protective coating comprises titanium dioxide as a white pigment.

4. Radiation image storage panel according to claim 1, wherein said surface roughness (Rz) is between 3 and 8 μm.

5. Radiation image storage panel according to claim 2, wherein said surface roughness (Rz) is between 3 and 8 μm.

6. Radiation image storage panel according to claim 3, wherein said surface roughness (Rz) is between 3 and 8 μm.

7. Radiation image storage panel according to claim 1, wherein said binder comprises an acrylate type polymer.

8. Radiation image storage panel according to claim 1, wherein said binder comprises a urethane acrylate.

9. Radiation image storage panel according to claim 2, wherein said binder comprises a urethane acrylate.

10. Radiation image storage panel according to claim 3, wherein said binder comprises a urethane acrylate.

11. Radiation image storage panel according to claim 1, wherein said white pigment is present in an amount by weight of up to 5% versus said binder.

12. Radiation image storage panel according to claim 2, wherein said white pigment is present in an amount by weight of up to 5% versus said binder.

13. Radiation image storage panel according to claim 3, wherein said white pigment is present in an amount by weight of up to 5% versus said binder.

14. Radiation image storage panel according to claim 1, wherein said white pigment is present in an amount by weight of up to 2% versus said binder.

15. Radiation image storage panel according to claim 1, wherein said white pigment is present in an amount by weight of up to 1% versus said binder.

16. Radiation image storage panel according to claim 1, wherein said phosphor particles are dispersed in a binding medium, being a polymeric binder, wherein said phosphor particles are present in a volume ratio of at least 80/20.

17. Radiation image storage panel according to claim 1, wherein said polymeric binder is at least one member selected from the group consisting of vinyl resins, polyesters, polyurethane resins and thermoplastic rubbers.

18. Radiation image storage panel according to claim 1, wherein said phosphor particles have a composition selected from the group consisting of BaFBr:Eu type stimulable phosphors.

19. Radiation image storage panel according to claim 1, wherein said phosphor particles have a composition selected from the group consisting of CsBr:Eu type stimulable phosphors.

20. Radiation image storage panel according to claim 1, wherein said protective coating is screen printed.

* * * * *